(12) United States Patent
Oharu et al.

(10) Patent No.: US 7,009,018 B2
(45) Date of Patent: Mar. 7, 2006

(54) TETRAFLUOROETHYLENE COPOLYMER

(75) Inventors: Kazuya Oharu, Yokohama (JP); Hidekazu Okamoto, Yokohama (JP); Shin Tatematsu, Yokohama (JP); Shigeki Kobayashi, Chiba (JP); Shinya Higuchi, Chiba (JP); Masataka Arai, Chiba (JP); Hiroki Nagai, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 62 days.

(21) Appl. No.: 11/080,636

(22) Filed: Mar. 16, 2005

(65) Prior Publication Data

US 2005/0187363 A1    Aug. 25, 2005

Related U.S. Application Data

(63) Continuation of application No. PCT/JP03/16104, filed on Dec. 16, 2003.

(30) Foreign Application Priority Data

Dec. 19, 2002  (JP) ............................. 2002-368823

(51) Int. Cl.
C08F 116/12 (2006.01)
C08F 16/24 (2006.01)
C08F 216/12 (2006.01)
C08F 114/18 (2006.01)
C08F 14/18 (2006.01)

(52) U.S. Cl. ..................... 526/247; 526/250; 526/255

(58) Field of Classification Search ............... 526/250, 526/247

See application file for complete search history.

(56) References Cited

U.S. PATENT DOCUMENTS

| | | | |
|---|---|---|---|
| 5,374,683 A * | 12/1994 | Morgan | ............... 525/200 |
| 6,518,381 B1 | 2/2003 | Kobayashi et al. | |
| 6,538,058 B1 | 3/2003 | Kobayashi et al. | |
| 6,646,078 B1 | 11/2003 | Kobayashi et al. | |
| 6,794,470 B1 | 9/2004 | Kobayashi et al. | |
| 6,803,437 B1 | 10/2004 | Kobayashi et al. | |
| 6,822,060 B1 | 11/2004 | Kobayashi et al. | |
| 2005/0064195 A1 | 3/2005 | Kobayashi et al. | |

FOREIGN PATENT DOCUMENTS

| | | |
|---|---|---|
| JP | 37-4643 | 7/1960 |
| JP | 44-14937 | 7/1969 |
| JP | 51-146588 | 12/1976 |
| JP | 56-26242 | 6/1981 |
| JP | 56-26243 | 6/1981 |
| JP | 57-18529 | 4/1982 |
| JP | 58-65722 | 4/1983 |
| JP | 58-91708 | 5/1983 |
| JP | 3-69926 | 11/1991 |
| JP | 5-3765 | 1/1992 |
| JP | 7-501096 | 2/1995 |
| JP | 8-26102 | 3/1996 |
| JP | 9-87334 | 3/1997 |
| JP | 10-259252 | 9/1998 |
| JP | 2001-354778 | 12/2001 |
| JP | 2005-015762 | * 1/2005 |
| WO | WO 93/10160 | 5/1993 |
| WO | WO 00/02935 | 1/2000 |

* cited by examiner

*Primary Examiner*—David W. Wu
*Assistant Examiner*—Ives Wu
(74) *Attorney, Agent, or Firm*—Oblon, Spivak, McClelland, Maier & Neustadt, P.C.

(57) ABSTRACT

Provided is a tetrafluoroethylene copolymer consisting of a unit based on tetrafluoroethylene and a unit based on a monomer represented by $CF_2=CFOR^{f1}R^{f2}$ (where $R^{f1}$ is a polyfluoroalkylene group which may contain an etheric oxygen atom and $R^{f2}$ is a polyfluorocycloalkyl group which may contain an etheric oxygen atom), wherein a content of the latter is from 0.005 to 0.5% by mass. The tetrafluoroethylene copolymer is excellent both in paste extrudability and in heat resistance, has characteristics such as excellent transparency of a molded product, and is suitably applicable to paste extrusion and compression molding.

10 Claims, No Drawings

TETRAFLUOROETHYLENE COPOLYMER

This is a continuation of Application No. PCT/JP03/16104, filed Dec. 16, 2003.

TECHNICAL FIELD

The present invention relates to a tetrafluoroethylene copolymer (hereinafter referred to as a "TFE copolymer") suitably applicable to paste extrusion and compression molding.

BACKGROUND ART

Fine powder of polytetrafluoroethylene (hereinafter referred to as "PTFE") is produced by coagulating polymer fine particles obtained by a so-called emulsion polymerization in which polymerization is effected in an aqueous medium with use of an emulsifier. It is technically known that PTFE is modified by copolymerizing tetrafluoroethylene (hereinafter referred to as "TFE") with a relatively small amount of a comonomer copolymerizable therewith.

It is also known that modification of PTFE is effective for improving processability in paste extrusion of fine powder with an appropriate coagent as an additive.

Heretofore, such a method is known, as a polymerization method for a modified PTFE, that a modifier is added to a polymerization system before 70% of a predetermined amount of TFE is consumed. Known materials to be used as the above-mentioned modifier include a perfluoroalkyltrifluoroethylene represented by hexafluoropropylene (hereinafter referred to as "HFP") and a chain transfer agent represented by methanol (JP-B37-4643).

Furthermore, it is conventionally proposed, as a polymerization method for a modified PTFE, to use two kinds of initiators consisting of a persulfate and a disuccinic acid peroxide in a system containing perfluoroalkyltrifluoroethylene or perfluoroalkyloxytrifluoroethylene as a comonomer (JP-B44-14937). It is also proposed to form a core-shell structure using a chlorotrifluoroethylene (hereinafter referred to as "CTFE") comonomer (JP-B-56-26242).

Furthermore, it is proposed to add hexafluoropropylene (hereinafter referred to as "HFP"), ω-hydroperfluoroolefin or vinylidene fluoride after polymerization of 70% of the total amount of monomers (JP-B-56-26243). In addition, it is proposed to form a core-shell structure using HFP or ω-hydroperfluoroolefin as a comonomer (JP-B-57-18529).

It is known that the modified PTFE fine powder obtained by these methods is excellent in extrudability but low in heat resistance. Therefore, such a core-shell structure is proposed that a linear-fluoroalkyl or chain-fluoroalkyl vinylether is used for the core and CTFE is used for the shell, in order to improve the heat resistance (JP-B-04-3765). However, it is insufficient in terms of reliable heat resistance because it has thermally unstable CTFE.

Furthermore, another polymerization method is proposed for a modified PTFE, in which PTFE is modified using Rfa-CH=CH$_2$ (Rfa is a perfluoroalkyl group) as a comonomer (JP-B-03-69926 and JP-B-08-26102). This method describes that the comonomer is continuously added up to a midway point of the polymerization in order to increase the degree of modification at an early stage.

However, this comonomer is also inadequate to achieve reliable heat resistance because its structure is not a perfluoro-structure but a hydrogen-containing structure.

In particular, further improvement in the heat resistance is recently required with increasing demands for the heat resistance of parts due to environmental measures to automobile exhaust emissions.

Furthermore, a polymerization method for a modified PTFE with improvement in the heat resistance is proposed, in which the heat resistance is improved by making a core-shell structure using a perfluorobutylethylene comonomer for the core and a HFP comonomer for the shell (at least 75% of the yield) (JP-A-09-87334). In addition, an improvement in the heat resistance is proposed by making a core-shell structure using a linear-fluoroalkyl or chain-fluoroalkyl vinylether comonomer for the core and charging a chain transfer agent for the shell (at least 80% of the yield)(the brochure of WO00/02935).

As described above, studies have been made on the use of the binary system of the persulfate and the disuccinic acid peroxide as a polymerization initiator, and on the TFE copolymers with both excellent paste extrudability and excellent heat resistance by the core-shell structure composed of the combinations of various comonomers conventionally known. However, the perfluoro monomer is generally low in reactivity and has a drawback in productivity and, for further improvement in the moldability, there have been needs for a comonomer having a novel structure.

DISCLOSURE OF THE INVENTION

An object of the present invention is to provide a TFE copolymer with excellent paste extrudability and heat resistance realized by a TFE copolymer produced from a monomer having good copolymerization reactivity with TFE.

The present invention provides a tetrafluoroethylene copolymer consisting of a unit based on tetrafluoroethylene and a unit based on a monomer represented by $CF_2=CFOR^{f1}R^{f2}$ (where $R^{f1}$ is a polyfluoroalkylene group which may contain an etheric oxygen atom and $R^{f2}$ is a polyfluorocycloalkyl group which may contain an etheric oxygen atom), wherein a content of the unit based on the monomer represented by $CF_2=CFOR^{f1}R^{f2}$ is from 0.005 to 0.5% by mass.

The present invention also provides a tetrafluoroethylene copolymer wherein the above-mentioned monomer represented by $CF_2=CFOR^{f1}R^{f2}$ is at least one selected from the group consisting of monomers represented by the following formula (1), formula (2) and formula (3):

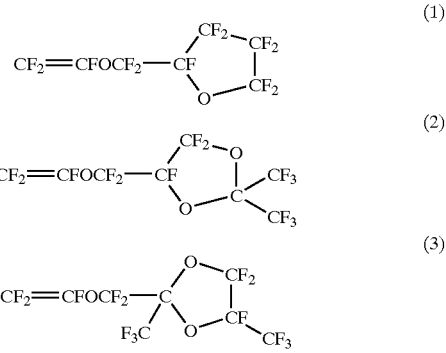

Furthermore, the present invention provides a TFE copolymer comprising a unit based on TFE and a unit based on a perfluorotetrahydrofurfuryl vinyl ether monomer represented by the following formula (1), wherein a content of the unit based on the monomer represented by the formula (1) is from 0.005 to 0.5% by mass.

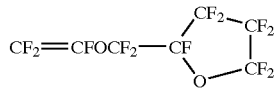

(1)

The present invention also provides the above-mentioned TFE copolymer, which is a TFE copolymer excellent in paste extrudability wherein an average particle size of primary particles is from 0.1 to 0.5 μm, wherein a standard specific gravity is from 2.14 to 2.25, and wherein the copolymer remains not undergoing melt molding and wherein a paste extrusion pressure is from 24.5 to 73.5 MPa.

The present invention also provides a method for producing the TFE copolymer comprising effecting an emulsion polymerization of TFE with the monomer represented by $CF_2=CFOR^{f1}R^{f2}$ under such a condition that a polymerization amount of the monomer is in a range of from 0.005 to 0.5% by mass; and adding to a reaction system a chain transfer agent in an amount of from 0.002 to 0.3% by mass relative to a total amount of units based on the TFE in a core and in a shell at a time of completion of reaction of at least 70% of the raw monomers.

The present invention also provides a method for producing the TFE copolymer comprising effecting an emulsion polymerization of TFE with the monomer represented by $CF_2=CFOR^{f1}R^{f2}$ under such a condition that a polymerization amount of the monomer is in a range of from 0.005 to 0.5% by mass; and adding to a reaction system hexafluoropropylene in an amount of from 0.002 to 0.3% by mass relative to a total amount of units based on the TFE in a core and in a shell at a time of completion of reaction of at least 70% of the raw monomers.

The present invention also provides a fine powder comprising the above-mentioned TFE copolymer, and a paste extruded product obtained by paste extrusion of the fine powder.

BEST MODE FOR CARRYING OUT THE INVENTION

A TFE copolymer of the present invention contains a unit based on a monomer represented by $CF_2=CFOR^{f1}R^{f2}$ (where $R^{f1}$ is a polyfluoroalkylene group which may contain an etheric oxygen atom and $R^{f2}$ is a polyfluorocycloalkyl group which may contain an etheric oxygen atom).

In the present invention, $R^{f1}$ in $CF_2=CFOR^{f1}R^{f2}$ is a polyfluoroalkylene group which may contain an etheric oxygen atom. It is preferably a perfluoroalkylene group which may contain an etheric oxygen atom, which has a carbon number of from 1 to 10 and no ring structure. The etheric oxygen atom can be present between carbon atoms or on the side of the $R^{f2}$-side chain. $R^{f1}$ is preferably a difluoromethylene group, a perfluorodimethylene group, a perfluorotrimethylene group or a —$CF_2CF(CF_3)O$— group. If $R^{f1}$ is present, $CF_2=CFOR^{f1}R^{f2}$ shows good copolymerizability with TFE.

$R^{f2}$ is a polyfluorocycloalkyl group which may contain an etheric oxygen atom, and is preferably a perfluorocycloalkyl group which may contain an etheric oxygen atom. The perfluorocycloalkyl group is preferably a group based on a four-membered ring, a five-membered ring or a six-membered ring, more preferably a group based on a four-membered ring or a five-membered ring. In addition, it may be a group based on plural ring structures such as a bicyclo ring and a tricyclo ring.

The above-mentioned ring is preferably a ring having one or two etheric oxygen atoms, more preferably an oxolane ring or a 1,3-dioxolane ring. A carbon atom in the ring may have a substituent bonded to, such as a polyfluoroalkyl group or a polyfluoroalkoxy group. The substituent is preferably a perfluoroalkyl group having a carbon number of at most 4 or a perfluoroalkoxy group having a carbon number of at most 4, more preferably a trifluoromethyl group. $R^{f2}$ is more preferably a perfluorocycloalkyl group having an oxygen atom in its ring. Specific examples of $R^{f2}$ include the following structures.

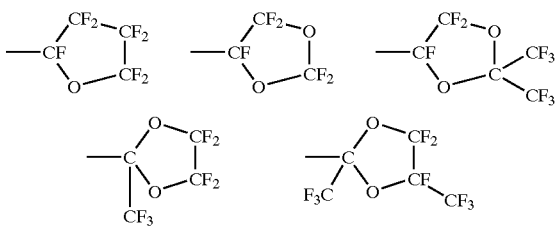

The monomer represented by $CF_2=CFOR^{f1}R^{f2}$ has adequate reactivity with TFE and imparts flexibility to the resulting TFE copolymer, thereby improving the extrudability. The monomer represented by $CF_2=CFOR^{f1}R^{f2}$ is preferably at least one selected from the group consisting of monomers represented by the following formula (1), formula (2) and formula (3).

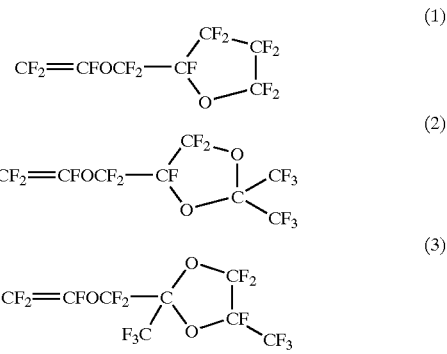

Furthermore, the monomer represented by the formula (1) is more preferably perfluorotetrahydrofurfuryl vinyl ether. Hereinafter, the compound represented by the formula (1) is also referred to as "PTFVE".

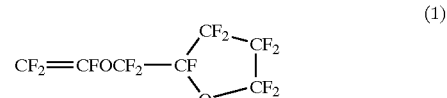

(1)

The monomer represented by the formula (1) can be produced by various methods. For example, it can be synthesized by fluorinating tetrahydrofurfuryl alcohol or that esterified with a perfluorocarboxylic acid halide, if necessary, and adding hexafluoropropen oxide (HFPO) to the resulting product or to a product obtained by liquidphase pyrolysis of perfluoroester, followed by vapor-phase pyrolysis. Furthermore, the monomers represented by the formula (2) and formula (3) can also be synthesized through the same reaction by changing the starting material from tetrahydrofurfuryl alcohol to 2,2-dimethyl-4-methylol-1,3-dioxolane or to 2,4-dimethyl-2-methylol-1,3-dioxolane.

In the TFE copolymer of the present invention a content of the unit based on the monomer represented by $CF_2=CFOR^{f1}R^{f2}$ is from 0.005 to 0.5% by mass, preferably from 0.01 to 0.3% by mass, and particularly preferably from 0.02 to 0.2% by mass. If the content is more than 0.5% by mass, the polymerization rate will decrease, which is undesirable from the viewpoint of productivity. In addition, it will also result in increasing a paste extrusion pressure and it tends to degrade the extrudability and to degrade the compression moldability as well. On the other hand, if the content is less than 0.005% by mass, it will lead to increase of the paste extrusion pressure, degradation of appearance of an extruded product, degradation of appearance of a compression molded product, etc. to fail to achieve substantial effect of modification.

In the TFE copolymer of the present invention, one or more other monomers can be used in combination with the TFE and the monomer represented by $CF_2=CFOR^{f1}R^{f2}$. In this case there are no particular restrictions on the structure of the other monomers used in combination as long as they are polymerizable compounds which can be copolymerized with TFE. However, from the viewpoint of the heat resistance of the resulting TFE copolymer, they are particularly preferably of a fluorine-containing structure; for example, a polymerizable perfluoro compound. A content of units based on the other monomers is preferably so adjusted that the total content of the units based on the monomer represented by $CF_2=CFOR^{f1}R^{f2}$ and based on the other monomers is from 0.005 to 0.5% by mass, particularly preferably from 0.02 to 0.2% by mass.

A chain transfer agent is preferably added at a late stage of the polymerization reaction of the TFE copolymer of the present invention, for example, at a point where at least 70% of the raw monomers have reacted. In particular, the chain transfer agent is more preferably added to the reaction system at a point where 75 to 95% of the raw monomers have reacted. If the chain transfer agent is added at a too early stage or in a too large amount, the TFE copolymer will increase low-molecular-weight parts to decrease the extrusion pressure too much, whereby microvoids will appear in an extrudate of the TFE copolymer to cause whitening. In addition, it can cause deterioration of mechanical properties of a molded product itself. Examples of the chain transfer agent usable herein include water-soluble organic compounds as represented by methanol, hydrogen, methane, ethane, propane and various types of halogenated hydrocarbons. It is also preferable to use hexafluoropropylene (hereinafter referred to as "HFP") instead of the chain transfer agent at a late stage of the above polymerization reaction. An amount of the chain transfer agent or the hexafluoropropylene to be added is preferably from 0.005 to 0.3% by mass, particularly preferably from 0.01 to 0.2% by mass.

A method for producing the TFE copolymer according to the present invention is preferably one comprising effecting an emulsion polymerization of TFE with the above-mentioned monomer represented by $CF_2=CFOR^{f1}R^{f2}$ under such a condition that a polymerization amount of the monomer is in a range of from 0.005 to 0.5% by mass; and adding to a reaction system a chain transfer agent in an amount of from 0.002 to 0.3% by mass relative to a total amount of units based on the TFE in a core and in a shell at a time of completion of reaction of at least 70% of the raw monomers. Another method is preferably one comprising effecting an emulsion polymerization of TFE with the above-mentioned monomer represented by $CF_2=CFOR^{f1}R^{f2}$ under such a condition that a polymerization amount of the monomer is in a range of from 0.005 to 0.5% by mass; and adding to a reaction system HFP in an amount of from 0.002 to 0.3% by mass relative to a total amount of units based on the TFE in the core and in the shell at a time of completion of reaction of at least 70% of the raw monomers.

The emulsion polymerization method is a method employing an aqueous medium, an emulsifier, a stabilization coagent, a polymerization initiator, and so on in the polymerization reaction of TFE. Furthermore, the preferred polymerization conditions are as follows: the polymerization temperature is from 10 to 95° C., the polymerization pressure is from 0.5 to 4.0 MPa, and the polymerization period of time is from 100 to 520 minutes.

Examples of the emulsifier preferably applicable include fluorine-containing organic acids such as perfluorooctanoic acid, perfluorononanoic acid, perfluoro-2,5-dimethyl-3,6-dioxanonanoic acid and perfluorooctanesulfonic acid, and ammonium salts or alkali metal salts (lithium salts, sodium salts, and potassium salts) thereof. An emulsifier may be used singly, or two or more emulsifiers may be used in combination. Examples of the stabilization coagent preferably applicable include paraffin wax, fluorine-based oils, fluorine-based solvents and silicone oil. A stabilization coagent may be used singly, or two or more stabilization coagents may be used in combination.

The polymerization initiator preferably applicable is a water-soluble radical initiator, a water-soluble oxidation-reduction catalyst, or the like. Examples of the water-soluble radical initiator preferably applicable include persulfates such as ammonium persulfate and potassium persulfate, and water-soluble organic peroxides such as disuccinic acid peroxide, bisglutaric acid peroxide and tert-butylhydroperoxide. A polymerization initiator may be used singly, or two or more polymerization initiators may be used in combination. It is preferable to use a mixed system of a persulfate and disuccinic acid peroxide.

A concentration of the TFE copolymer in a dispersion liquid of the TFE copolymer obtained by the emulsion polymerization is preferably from 10 to 45% by mass. If the TFE copolymer concentration is too low, it will be difficult to coagulate the TFE copolymer. On the other hand, if it is too high, part of the TFE copolymer will remain uncoagulated to cause white turbidity of a coagulation solution. The TFE copolymer concentration is more preferably from 15 to 45% by mass, still more preferably from 20 to 43% by mass.

The powder can be obtained from the emulsion polymerization solution by a known method. Namely, the TFE copolymer dispersion liquid is diluted with water so that the concentration thereof becomes, preferably, from 10 to 20% by mass, and then is vigorously stirred to coagulate. Depending on the circumstances, pH may be controlled, or a coagulation coagent such as an electrolyte or a water-soluble organic solvent may be added. Then the solution is stirred appropriately, whereby polymer particles coagulated are separated from water, followed by granulation, spherization and drying.

The drying is normally carried out in a state of causing little flow of wet powder obtained by the coagulation, preferably in a state of leaving it at rest, by means of vacuum, a high frequency wave, hot air or the like.

The fine powder of TFE copolymer has a property of being fibrillated even by a small shear force to lose the state of original crystalline structure after completion of polymerization. It is undesirable that particles of the powder be brought in contact or friction with each other, particularly, at a high temperature in order to prevent increase of extrusion pressure, particularly, in the paste extrusion. The drying is preferably carried out at from 10 to 250° C., particularly preferably from 100 to 200° C.

For the fine powder of TFE copolymer, an average particle size of primary particles is preferably in a range of from 0.1 to 0.5 μm, particularly preferably in a range of from 0.14 to 0.38 μm, and a standard specific gravity is preferably in a range of from 2.14 to 2.25, particularly preferably in a range of from 2.16 to 2.23. In a case where the standard specific gravity falls within the range, a molding pressure is low and a resulting molded product is superior in dimensional stability and surface smoothness. Furthermore, the fine powder of TFE copolymer preferably remains not undergoing melt molding and a paste extrusion pressure is from 24.5 to 73.5 MPa, particularly preferably at from 34.5 to 55.5 MPa. In addition, the fine powder of TFE copolymer preferably has a bulk density of from 0.35 to 0.58 g/ml.

A fine powder of the TFE copolymer according to the present invention is preferably one produced by effecting an emulsion polymerization of TFE with the above-mentioned monomer represented by $CF_2=CFOR^{f1}R^{f2}$ under such a condition that a polymerization amount of the monomer is in a range of from 0.005 to 0.5% by mass; and adding to a reaction system a chain transfer agent in an amount of from 0.002 to 0.3% by mass relative to a total amount of units based on the TFE in a core and in a shell at a time of completion of reaction of at least 70% of the raw monomers. Another fine powder is preferably one produced by effecting an emulsion polymerization of TFE with the above-mentioned monomer represented by $CF_2=CFOR^{f1}R^{f2}$ under such a condition that a polymerization amount of the monomer is in a range of from 0.005 to 0.5% by mass; and adding to a reaction system HFP in an amount of from 0.002 to 0.3% by mass relative to a total amount of units based on the TFE in a core and in a shell at a time of completion of reaction of at least 70% of the raw monomers.

The fine powder of TFE copolymer of the present invention is applicable to the paste extrusion. The paste extrusion is a molding method in which the fine powder of TFE copolymer is mixed with a lubricant to impart fluidity to the fine powder of TFE copolymer and in which it is extruded into a molded product such as a film, a tube or the like. A mixing ratio of the lubricant is optionally selected so that the fine powder of TFE copolymer can possess fluidity. It is usually preferably from 10 to 30% by mass relative to the total amount of the fine powder of TFE copolymer and the lubricant, particularly preferably from 15 to 20% by mass. The lubricant preferably used is Naphtha or one of petroleum hydrocarbons having a dry point of at least 100° C.

Furthermore, an additive such as a pigment can be added for coloring and various fillers can be added for imparting strength, electric conductivity and so on.

The paste extrusion pressure is preferably from 24.5 to 73.5 MPa, particularly preferably from 34.5 to 55.5 MPa.

Now the present invention will be described in further detail with reference to Examples. However, the present invention is by no means thereby restricted. Measuring methods for properties of the TFE copolymer and granulated substance are as in the following (A) to (H).

(A) Average primary particle size of TFE copolymer (unit: μm): measured by means of a laser scattering particle size distribution analyzer (trade name "LA-920", manufactured by HORIBA, Ltd.).

(B) Average particle size of coagulated powder (unit: μm): measured in conformity with JIS K6891. 20-mesh, 30-mesh, 40-mesh, 45-mesh and 60-mesh standard sieves were sequentially put together in order from the top, and the powder was placed on the 20-mesh sieve to be sieved. A mass of powder particles remaining on each sieve was obtained. The 50% particle size calculated by a logarithmic probability paper based on the obtained masses was taken as the average particle size.

(C) Apparent density (unit: g/ml): measured in conformity with JIS K6891. A sample was dropped from a funnel set above, into a stainless steel weighing bottle with an inner volume of 100 ml, and a part of the sample bulging from the weighing bottle was scraped off with a flat plate. Thereafter, the weight of the sample remaining in the weighing bottle was measured and a value obtained by dividing the weight of the sample by the inner volume of the weighing bottle was taken as the apparent density.

(D) Standard specific gravity (hereinafter also referred to as "SSG"): measured in conformity with ASTM D1457-91a and D4895-91a. 12.0 g of a resin was weighed and kept in a cylindrical die with an inner diameter of 28.6 mm under a pressure of 34.5 MPa for 2 minutes. It was inserted into an oven at 290° C. and the temperature was raised at a rate of 120° C./hr. It was kept at 380° C. for 30 minutes. Then the temperature was decreased at a rate of 60° C./hr and the die was kept at 294° C. for 24 minutes. The molded product was kept in a desiccator at 23° C. for 12 hours, and thereafter specific gravities of the molded product and water at 23° C. were measured. A ratio of the products to water was taken as the standard specific gravity. The smaller the value of SSG, the greater the molecular weight.

(E) Thermal instability index TII: measured in conformity with ASTM D1457-91a and D4895-91a. A sample for an extended specific gravity (hereinafter referred to as "ESG") was prepared in the same manner as in the case of SSG except that the retention time at 380° C. was 360 minutes.

It was calculated based on the formula $TII=(ESG-SSG)\times 1000$.

The smaller the value of TII, the less the molecular weight changes in the case where the retention time at 380° C. is longer. Namely, it shows superiority in heat resistance.

(F) Content of units based on comonomer: determined from infrared absorbance measured for a thin-film disk prepared by press molding the raw TFE copolymer powder.

A content of units based on the monomer represented by the formula (1) was determined as a numerical value obtained by multiplying a ratio of absorbance at 1002 $cm^{-1}$ to absorbance at 2367 $cm^{-1}$ by 2.99. A content of units based on the monomer represented by the formula (2) was determined as a numerical value obtained by multiplying a ratio of absorbance at 978 $cm^{-1}$ to absorbance at 2370 $cm^{-1}$ by 6.6. A content of units based on the monomer represented by the formula (3) was determined as a numerical value obtained by multiplying a ratio of absorbance at 984 $cm^{-1}$ to absorbance at 2370 $cm^{-1}$ by 6.3.

A content of units based on CTFE was obtained in conformity with the method described in JP-B-04-3765, i.e. by multiplying a ratio of absorbance at 957 $cm^{-1}$ to absorbance at 2360 $cm^{-1}$ by 0.58. A content of units based on perfluoropropyl vinyl ether (hereinafter referred to as "PPVE") was obtained in conformity with the method described in the brochure of WO00/02935, i.e. by multiplying a ratio of absorbance at 995 $cm^{-1}$ to absorbance at 935 $cm^{-1}$ by 0.14.

(G) Paste extrusion pressure: 226.8 g of polymer powder and 43.2 g of a hydrocarbon lubricant: Isopar (trade mark)

H (manufactured by Exxon Company) were mixed in a glass bottle, and matured at room temperature (25° C.) for at least eight hours. Then the above mixture was filled in a cylinder having an inner diameter of 39.4 mm and kept for two minutes while exerting a load of 55 kg to a piston inserted in the cylinder. The above mixture was taken out of the cylinder, put into an extrusion die (die angle: 20°, and diameter of orifice: 0.27 mm) with a cylinder (inner diameter: 40.3 mm) and extruded at a ram rate of 20 mm/min and at a die temperature of 40° C., thereby obtaining a string-like product (beading). It is noted here that RR is a ratio of a cross-sectional area of a cylinder (Ac) of an extruder to a cross-sectional area of a die (Ad), namely, a reduction ratio (RR) is defined as RR=Ac/Ad. In this example, RR was 1000. A paste extrusion pressure (MPa) was obtained as a value calculated by dividing an extrusion force at a range in which a pressure is in an equilibrium state in the latter half of extrusion, by the cylinder cross-sectional area.

(H) Transparency and surface smoothness (moldability): transparency and surface smoothness (moldability) were determined with a wire coating material produced by the following procedure. Isopar (trade mark) H was added in a rate of 18% by mass to 700 g of a fine powder of PTFE, and they were blended by rotation at 100 rpm for 30 minutes. The blended resin was matured at room temperature for at least eight hours. After performing a preliminary molding, a wire [AWG20 composed of 19 nickel-plated strands of 0.202 mm and having the outer diameter of 1.01 mm] was continuously coated with the resin under a condition of RR=1200 by an extruder. It was made to pass through an oven for removal of the lubricant at 250° C., sintered in an oven at 425° C. and quenched to room temperature. The transparency was evaluated by eye observation to observe the outer appearance of the wire coating material obtained. The evaluation results were represented by ○ and X according to the following criteria. ○: outer appearance in which the coating resin is as transparent as the original color of the wire is visible, and X: outer appearance in which the coating resin is milky white, as compared with "○", so that the original color of the wire is whitened to become invisible. The surface smoothness was evaluated by eye observation to observe the outer appearance of the wire coating material obtained. The evaluation results were represented by ○ and X according to the following criteria. ○: smooth outer appearance and X: no smooth outer appearance.

REFERENCE EXAMPLE 1

Synthesis of Perfluorotetrahydrofurfuryl Vinyl Ether of Formula (1) Esterification Reaction Charged into a flask were 20 g of 2-tetrahydrofurfuryl alcohol and 21.8 g of triethylamine, followed by stirring in an ice bath. Then 71.5 g of FCOCF(CF$_3$)OCF$_2$CF$_2$CF$_3$ was dropwise added over one hour while maintaining the inner temperature at a temperature of at most 10° C. After completion of the dropwise addition, the mixture was stirred at room temperature for two hours and 50 ml of water was added at the inner temperature of at most 15° C. The crude liquid thus obtained was subjected to liquid separation, washed with water, dried over magnesium sulfate, filtered and distilled under a reduced pressure, thereby obtaining 66.3 g of an ester compound of formula (II).

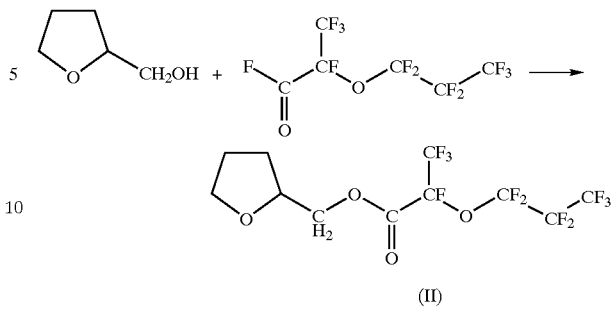

Fluorine Reaction 313 g of trichlorotrifluoroethane (R-113) was charged into a 500 ml autoclave made of nickel, stirred and maintained at 25° C. After nitrogen gas was blown thereinto for one hour, fluorine gas diluted to 20% with nitrogen gas was blown thereinto at a flow rate of 8.08 l/h for one hour. Thereafter, while blowing nitrogen gas at the same flow rate, a solution having 5.01 g of the ester compound (II) dissolved in 100 g of R-113 was injected over 4.7 hours. Furthermore, while blowing fluorine gas at the same flow rate, 9 ml of an R-113 solution with a benzene concentration of 0.01 g/ml was injected with increasing temperature from 25° C. to 40° C., and stirred for 0.4 hour. Then the pressure was returned to an ordinary pressure, and 6 ml of the above benzene solution was injected while maintaining the temperature inside the reactor at 40° C., and was stirred for 4 hours. The same operation was further repeated three times. The total amount of benzene injected was 0.33 g and that of R-113 was 33 ml.

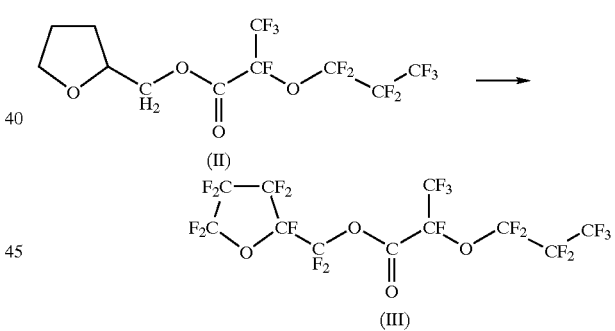

Pyrolysis of Perfluoroester 2.1 g of a compound (III) resulting from the fluorination together with 0.02 g of NaF powder was charged into a flask, and heated at 140° C. under stirring. A reflux apparatus controlled at −10° C. was set at an upper part of the flask. After cooling, 2.0 g of a liquid sample was collected and it was subjected to precision distillation to obtain 0.8 g of a compound (IV).

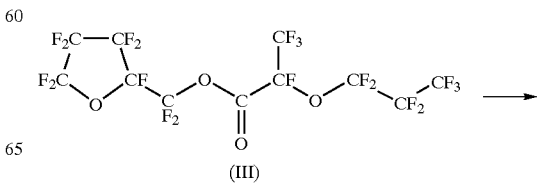

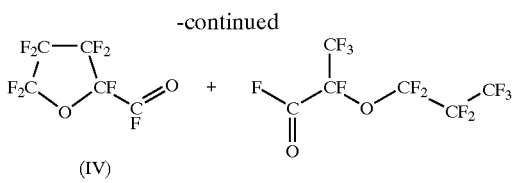

(IV)

Synthesis of Perfluorotetrahydrofurfuryl Vinyl Ether 16.5 g of CsF dehydrated and dried was charged into an autoclave. The inside of the reactor was then deaerated; 662 g (2.7 mol) of the compound (IV) and 139 g of tetraglyme were charged thereinto; the reactor was cooled to −20° C.; and 450 g (2.7 mol) of hexafluropropylene oxide (HFPO) was continuously supplied so that the inner pressure of the reactor was maintained at a slight reduced pressure, thereby carrying out the reaction. After completion of the reaction, 1010 g of the resultant was collected by a separatory funnel and washed with tetraglyme. The resultant was dropwise added to an aqueous solution having 330 g of KOH dissolved and water was distilled off after neutralization. A white solid thus obtained was dried under a reduced pressure and a metal trap cooled at the liquid nitrogen temperature was connected while keeping the reduced-pressure condition. The temperature inside a drier was increased to 270° C. While a gas generated by decomposition reaction was collected inside the metal trap, the reaction was continued up to an end of generation of gas, thereby obtaining 700 g of a compound (1)

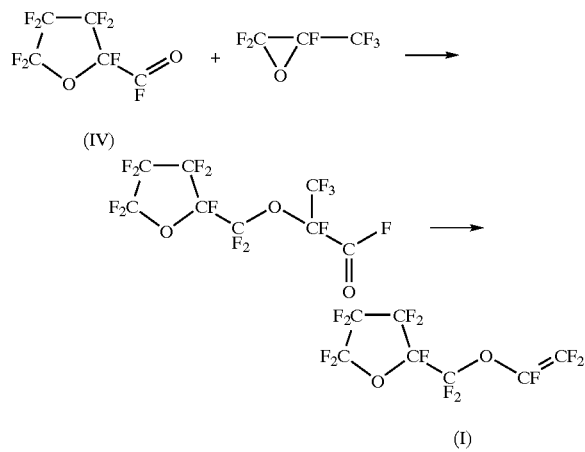

REFERENCE EXAMPLE 2

Synthesis of Monomer Represented by Formula (2)

The monomer represented by the formula (2) was produced in the same reaction procedure as in Reference Example 1 except that 2,2-dimethyl-4-methylol-1,3-dioxolane was used instead of 2-tetrahydrofurfuryl alcohol.

REFERENCE EXAMPLE 3

Synthesis of Monomer Represented by Formula (3)

The monomer represented by the formula (3) was produced in the same reaction procedure as in Reference Example 1 except that 2,4-dimethyl-2-methylol-1,3-dioxolane was used instead of 2-tetrahydrofurfuryl alcohol.

EXAMPLE 1

Charged into a 100-liter stainless steel autoclave equipped with a baffle plate and a stirrer were 6 g of ammonium perfluorooctanoate, 565 g of paraffin wax and 60 liters of deionized water. The air in the autoclave was replaced with nitrogen and then the pressure was reduced. 52 g of the monomer represented by the formula (1) was charged into the autoclave. The pressure was increased with TFE and the temperature was raised to 67° C. under stirring. Then the pressure was raised to 1.85 MPa with TFE and 5.0 g of disuccinic acid peroxide and 0.28 g of ammonium persulfate dissolved in warm water at about 70° C. were injected into the autoclave. The inner pressure decreased to 1.83 MPa in about 4 minutes.

Polymerization was made to proceed while adding TFE to keep the inner pressure of the autoclave at 1.85 MPa. 84 g of ammonium perfluorooctanoate was introduced at a point where the amount of TFE added reached 3.0 kg. 4 g of methanol and 3.2 g of ammonium persulfate dissolved in pure water at an ordinary temperature were added at a point where the amount of TFE added reached 24.3 kg.

The reaction was terminated at a point where the amount of TFE added reached 32.5 kg, and TFE in the autoclave was released into the atmosphere. The polymerization period was 3 hours and 11 minutes. The emulsified dispersion liquid of the TFE copolymer thus obtained was cooled and the supernatant paraffin wax was removed. The emulsified dispersion liquid had a solid content of 34% by mass. The polymer had an average primary particle size of 0.21 μm.

This emulsified dispersion liquid was diluted with pure water to a concentration of 12% by mass, and adjusted to 30° C. and stirred, thereby obtaining powder. Then the powder was dried at 120° C. The powder of TFE copolymer obtained had an average particle size of 565 μm and a bulk density of 0.47 g/ml. The powder had a standard specific gravity of 2.178 and a TII of −6, thus showing good heat resistance.

Furthermore, in an infrared absorption spectrum of the TFE copolymer thus obtained, absorptions based on the monomer represented by the formula (1) were observed at 887 cm$^{-1}$ and at 1002 cm$^{-1}$, which are not observed in a spectrum of a TFE homopolymer. The content of the unit based on the monomer represented by the formula (1) in the TFE copolymer was calculated from the absorptions and found to be 0.10% by mass.

EXAMPLE 2

Charged into a 100-liter stainless steel autoclave equipped with a baffle plate and a stirrer were 6 g of ammonium perfluorooctanoate, 565 g of paraffin wax and 60 liters of deionized water. The air in the autoclave was replaced with nitrogen, then the pressure was reduced, and 62 g of the monomer represented by the formula (2) was charged into the autoclave. The pressure was increased with TFE and the temperature was raised to 67° C. under stirring. Then the pressure was raised to 1.67 MPa with TFE and 5.0 g of disuccinic acid peroxide and 0.21 g of ammonium persulfate dissolved in warm water at about 70° C. were injected into the autoclave. The inner pressure decreased to 1.65 MPa in about 3 minutes.

Polymerization was made to proceed while adding TFE to keep the inner pressure of the autoclave at 1.67 MPa. 84 g of ammonium perfluorooctanoate was introduced at a point where the amount of TFE added reached 3.0 kg. 4 g of methanol and 3.2 g of ammonium persulfate dissolved in pure water at an ordinary temperature were added at a point where the amount of TFE added reached 24.3 kg.

The reaction was terminated at a point where the amount of TFE added reached 32.5 kg, and TFE in the autoclave was released into the atmosphere. The polymerization period was 2 hours and 28 minutes. The emulsified dispersion liquid of the TFE copolymer thus obtained was cooled and the supernatant paraffin wax was removed. The emulsified dispersion liquid had a solid content of about 33% by mass. The polymer had an average primary particle size of 0.20 μm.

This emulsified dispersion liquid was diluted with pure water to a concentration of 12% by mass, and adjusted to 30° C. and stirred, thereby obtaining powder. Then the powder was dried at 120° C. The powder of TFE copolymer obtained had an average particle size of 640 μm and a bulk density of 0.47 g/ml. The powder had a standard specific gravity of 2.172 and a TII of −5, thus showing good heat resistance.

Furthermore, in an infrared absorption spectrum of the TFE copolymer thus obtained, absorptions were observed at 978 $cm^{-1}$ and at 1012 $cm^{-1}$, which were not observed in a spectrum of a TFE homopolymer. The content of the unit based on the monomer represented by the formula (2) was calculated from the absorptions, and found to be 0.04% by mass.

EXAMPLE 3

Charged into a 100-liter stainless steel autoclave equipped with a baffle plate and a stirrer were 6 g of ammonium perfluorooctanoate, 565 g of paraffin wax and 60 liters of deionized water. The air in the autoclave was replaced with nitrogen, then the pressure was reduced, and 54 g of the monomer represented by the formula (3) was charged into the autoclave. The pressure was increased with TFE and the temperature was raised to 67° C. under stirring. Then the pressure was raised to 1.67 MPa with TFE and 5.0 g of disuccinic acid peroxide and 0.21 g of ammonium persulfate dissolved in warm water at about 70° C. were injected into the autoclave. The inner pressure decreased to 1.65 MPa in about 3 minutes.

Polymerization was made to proceed while adding TFE to keep the inner pressure of the autoclave at 1.67 MPa. 84 g of ammonium perfluorooctanoate was introduced at a point where the amount of TFE added reached 2.6 kg. 4 g of methanol and 3.2 g of ammonium persulfate dissolved in pure water at an ordinary temperature were added at a point where the amount of TFE added reached 21.5 kg.

The reaction was terminated at a point where the amount of TFE added reached 28 kg, and TFE in the autoclave was released into the atmosphere. The polymerization period was 2 hours and 44 minutes. The emulsified dispersion liquid of the TFE copolymer thus obtained was cooled and the supernatant paraffin wax was removed. The emulsified dispersion liquid had a solid content of about 30% by mass. The polymer had an average primary particle size of 0.27 μm.

This emulsified dispersion liquid was diluted with pure water to a concentration of 12% by mass, and adjusted to 30° C. and stirred, thereby obtaining powder. Then the powder was dried at 120° C. The powder of TFE copolymer obtained had an average particle size of 570 μm and a bulk density of 0.51 g/ml. The powder had a standard specific gravity of 2.186 and a TII of −4, thus showing good heat resistance.

Furthermore, in an infrared absorption spectrum of the TFE copolymer thus obtained, an absorption was observed at 984 $cm^{-1}$, which was not observed in a spectrum of a TFE homopolymer. The content of the unit based on the monomer represented by the formula (3) was calculated from the absorption, and found to be 0.06% by mass.

It is noted that transparency and surface smoothness were evaluated in Example 3 with use of the lubricant Isopar H in a rate of 16% by mass.

COMPARATIVE EXAMPLE 1

The reaction was carried out in the same manner as in Example 1 except that 17.6 g of CTFE was charged instead of the comonomer in Example 1, to obtain a TFE copolymer.

COMPARATIVE EXAMPLE 2

The reaction was carried out in the same manner as in Example 1 except that 40.2 g of PPVE was charged instead of the comonomer in Example 1, to obtain a TFE copolymer.

Table 1 shows properties of TFE polymers in Examples and Comparative Examples.

TABLE 1

|  | Ex. 1 | Ex. 2 | Ex. 3 | Comp. Ex. 1 | Comp. Ex. 2 |
|---|---|---|---|---|---|
| Comonomer | Formula (1) | Formula (2) | Formula (3) | CTFE | PPVE |
| Content of units based on comonomer (% by mass) | 0.10 | 0.04 | 0.06 | 0.05 | 0.10 |
| Average primary particle size of TFE copolymer (μm) | 0.21 | 0.20 | 0.27 | 0.23 | 0.19 |
| Bulk density (g/ml) | 0.47 | 0.47 | 0.51 | 0.50 | 0.47 |
| Average particle size of coagulated powder (μm) | 565 | 640 | 570 | 650 | 490 |
| SSG | 2.178 | 2.172 | 2.186 | 2.204 | 2.187 |
| Paste extrusion pressure (MPa) | 39.7 | 41.2 | 32.7 | 41.6 | 42.8 |
| Heat resistance (TII) | −6 | −5 | −4 | 47 | 0 |
| Transparency | ○ | ○ | ○ | X | ○ |
| Moldability (surface smoothness) | ○ | ○ | ○ | ○ | X |

INDUSTRIAL APPLICABILITY

The TFE copolymer according to the present invention has excellent properties, i.e., both excellent paste extrudability and heat resistance. Furthermore, the molded product of the TFE copolymer according to the present invention is also excellent in transparency.

Since the TFE copolymer of the present invention has excellent properties such as excellent paste extrudability, heat resistance and transparency, it can be used for tubes, wire coatings, seal materials, porous films, filters, and so on. The paste extruded product of the TFE copolymer is applicable to molded products of various shapes such as tubular, sheet-like, film-like, fibrous, and block-like shapes.

The entire disclosure of Japanese Patent Application No. 2002-368823 filed on Dec. 19, 2002 including specification, claims and summary is incorporated herein by reference in its entirety.

What is claimed is:

1. A tetrafluoroethylene copolymer consisting of a unit based on tetrafluoroethylene and a unit based on a monomer represented by $CF_2=CFOR^{f1}R^{f2}$ (where $R^{f1}$ is a polyfluoroalkylene group which may contain an etheric oxygen atom and $R^{f2}$ is a polyfluorocycloalkyl group which may contain an etheric oxygen atom), wherein a content of the unit based on the monomer represented by $CF_2=CFOR^{f1}R^{f2}$ is from 0.005 to 0.5% by mass.

2. The tetrafluoroethylene copolymer according to claim 1, wherein the monomer represented by $CF_2=CFOR^{f1}R^{f2}$ is at least one selected from the group consisting of monomers represented by the following formula (1), formula (2) and formula (3):

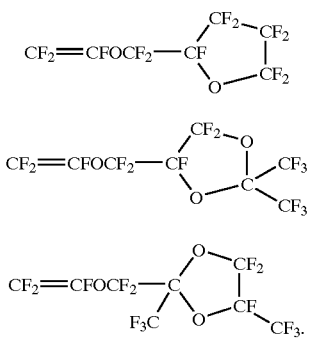

3. A tetrafluoroethylene copolymer consisting of a unit based on tetrafluoroethylene and a unit based on a perfluorotetrahydrofurfuryl vinyl ether monomer represented by the following formula (1), wherein a content of the unit based on the monomer represented by the formula (1) is from 0.005 to 0.5% by mass

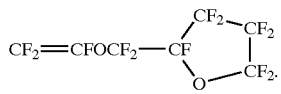

4. The tetrafluoroethylene copolymer according to claim 1, which is a tetrafluoroethylene copolymer excellent in paste extrudability wherein an average particle size of primary particles is from 0.1 to 0.5 μm, wherein a standard specific gravity is from 2.14 to 2.25, and wherein the copolymer remains not undergoing melt molding and a paste extrusion pressure is from 24.5 to 73.5 MPa.

5. The tetrafluoroethylene copolymer according to claim 1, wherein the content of the unit based on the monomer represented by the formula (1) is from 0.01 to 0.3% by mass.

6. The tetrafluoroethylene copolymer according to claim 1, wherein the content of the unit based on the monomer represented by the formula (1) is from 0.02 to 0.2% by mass.

7. A method for producing the tetrafluoroethylene copolymer as defined in claim 1, comprising effecting an emulsion polymerization of tetrafluoroethylene with the monomer represented by $CF_2=CFOR^{f1}R^{f2}$ under such a condition that a polymerization amount of the monomer is in a range of from 0.005 to 0.5% by mass; and adding to a reaction system a chain transfer agent in an amount of from 0.002 to 0.3% by mass relative to a total amount of units based on the tetrafluoroethylene in a core and in a shell at a time of completion of reaction of at least 70% of the raw monomers.

8. A method for producing the tetrafluoroethylene copolymer as defined in claim 1, comprising effecting an emulsion polymerization of tetrafluoroethylene with the monomer represented by $CF_2=CFOR^{f1}R^{f2}$ under such a condition that a polymerization amount of the monomer is in a range of from 0.005 to 0.5% by mass; and adding to a reaction system hexafluoropropylene in an amount of from 0.002 to 0.3% by mass relative to a total amount of units based on the tetrafluoroethylene in a core and in a shell at a time of completion of reaction of at least 70% of the raw monomers.

9. A fine powder comprising the tetrafluoroethylene copolymer as defined in claim 1.

10. A paste extruded product obtained by paste extrusion of the fine powder as defined in claim 9.

* * * * *